United States Patent
Rajaram et al.

(10) Patent No.: US 9,930,078 B2
(45) Date of Patent: Mar. 27, 2018

(54) THIRD-PARTY COMMUNICATIONS TO SOCIAL NETWORKING SYSTEM USERS USING USER DESCRIPTORS

(71) Applicant: Facebook, Inc., Menlo Park, CA (US)

(72) Inventors: Gokul Rajaram, Los Altos, CA (US); Antonio Felipe Garcia-Martinez, Alameda, CA (US); Brian Thomas Boland, Los Altos, CA (US); Nipun Mathur, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/687,397

(22) Filed: Nov. 28, 2012

(65) Prior Publication Data

US 2014/0149502 A1    May 29, 2014

(51) Int. Cl.
G06F 15/16     (2006.01)
H04L 29/06     (2006.01)
H04L 12/58     (2006.01)

(52) U.S. Cl.
CPC ............ H04L 65/403 (2013.01); H04L 51/28 (2013.01); H04L 51/32 (2013.01)

(58) Field of Classification Search
CPC ....... H04L 67/10; H04L 67/306; H04L 41/50; H04L 51/10; H04L 51/18; H04L 51/36;
(Continued)

(56) References Cited

U.S. PATENT DOCUMENTS

2007/0121843 A1    5/2007 Atazky et al.
2009/0055267 A1*   2/2009 Roker ................. G06F 17/3089
                                                    705/14.1
(Continued)

FOREIGN PATENT DOCUMENTS

CN    101821757 A    9/2010
JP    2010-055456 A  3/2010
(Continued)

OTHER PUBLICATIONS

Cohen, D. "Select Facebook Advertiser Can Target Ads by Email, Phone Number, User ID—All Facebook," Sep. 6, 2012, one page. [Online] [Retrieved May 8, 2014] Retrieved from the Internet <URL:http://allfacebook.com/target-ads-email-phone-number-user-id_b98975.>.
European Patent Office, Search Report and Opinion, European Patent Application No. 13192882.2, dated Jan. 3, 2014, six pages.
PCT International Search Report and Written Opinion, PCT Application No. PCT/US2013/070165, dated Mar. 4, 2014, thirteen pages.
Canadian Office Action, Canadian Application No. 2,891,449, dated Jun. 1, 2016, 4 pages.
Mexican Institute of Industrial Property, Office Action, Mexican Patent Application No. MX/a/2015/006645, dated Aug. 4, 2016, summary dated Aug. 16, 2016, five pages [with summary in English].
(Continued)

*Primary Examiner* — Oscar Louie
*Assistant Examiner* — Da T Ton
(74) *Attorney, Agent, or Firm* — Fenwick & West LLP (57) ABSTRACT

Based on information used by the external system to identify a target user, the external system generates a target user hash identifier that is communicated to the social networking system along with a message. Using information from user profiles maintained by the social networking system, the social networking system generates hash identifiers for its users and compares the target user hash identifier to the generated hash identifiers hash identifiers for social networking system users are generated. The social networking system sends the message to a user associated with a hash identifier generated from user profile information that matches the target user hash identifier. Hence, an external application may communicate with social networking system users without accessing access information about the users maintained by the social networking system.

21 Claims, 5 Drawing Sheets

(58) Field of Classification Search
CPC ........... G06Q 30/0251; G06Q 30/0269; G06Q 30/0277; G06Q 50/01; H04N 21/4622; H04W 4/001
USPC ................ 709/204–207, 217–219, 238, 246; 705/13, 35, 43, 50, 14.49, 14.56, 14.66; 725/14, 34, 35, 146
See application file for complete search history.

(56) References Cited

U.S. PATENT DOCUMENTS

| | | | |
|---|---|---|---|
| 2010/0306043 A1* | 12/2010 | Lindsay | G06Q 30/02 705/14.41 |
| 2010/0324996 A1 | 12/2010 | Kim et al. | |
| 2011/0060905 A1* | 3/2011 | Stack | G06Q 10/10 713/167 |
| 2011/0137975 A1* | 6/2011 | Das | G06F 21/6254 709/203 |
| 2011/0238985 A1* | 9/2011 | Sovio | H04N 21/2347 713/168 |
| 2012/0036019 A1* | 2/2012 | Broumand | G06Q 30/02 705/14.66 |
| 2012/0136708 A1* | 5/2012 | Chang | G06Q 10/00 705/14.23 |
| 2013/0138569 A1* | 5/2013 | Yan | G06Q 30/02 705/50 |

FOREIGN PATENT DOCUMENTS

| | | |
|---|---|---|
| KR | 10-2012-0067105 A | 6/2012 |
| WO | WO 2010/138512 A1 | 12/2010 |

OTHER PUBLICATIONS

Canadian Intellectual Property Office, Office Action, Canadian Patent Application No. 2,891,449, dated Apr. 21, 2017, three pages.
Delo, C., "Facebook to Roll Out Email, Phone Number Ad Targeting," Aug. 30, 2012, five pages. [Online] [Retrieved May 22, 2107] Retrieved from the Internet <URL:http://adage.com/article/digital/facebook-roll-email-phone-number-ad-targeting/236964/>.
European Patent Office, Examination Report, European Patent Application No. 13192882.2, dated May 29, 2017, five pages.
State Intellectual Property Office of the People's Republic of China, First Office Action, Chinese Patent Application No. 2013800714575, dated May 18, 2017, fifteen pages.

* cited by examiner

FIG. 5

THIRD-PARTY COMMUNICATIONS TO SOCIAL NETWORKING SYSTEM USERS USING USER DESCRIPTORS

BACKGROUND

This invention relates generally to communications in a social networking system, and more specifically to communicating messages from an application, page, or other third party entity that has a presence on the social networking system to users of the social networking system.

Social networking systems maintain relationships between their users. Additionally, a social networking system allows users to interact with one another by sending messages, sharing content, and forming relationships within the social networking system. Users of a social networking system may be individual users or non-individual entities, such as a restaurant, retailer, brand owner, or business. These non-individual entities may maintain information about users in a user database, such as a customer resource management (CRM) database, but they do not have a convenient means for communicating to their customers through the social networking system.

SUMMARY

A social networking system allows a system external to the social networking system to communicate messages to social networking system users without sharing information personally identifying the social networking system users to the social networking system. For example, an application external to the social networking system may communicate messages to application users via the social networking system. Information used by the external system to identify a target user is used by the external system to generate a target user hash identifier that is communicated to the social networking system. The social networking system generates hash identifiers from information from user profiles maintained by the social networking system. For example, the external system sends the social networking system a message along with the hash identifier of the target user and the hash function used to generate the hash identifier. The social networking system then applies the hash function to user profile data to generate hash identifiers. The target user hash identifier is compared to the hash identifiers for social networking system users, and information associated with a user profile used to generate a hash identifier matching the target user hash identifier is used to communicate information from the external system to the target user via the social networking system. Hence, the social networking system allows the external system to more easily provide information to users of the application without allowing the external application to access information about the users maintained by the social networking system.

The hash identifiers and the target user hash identifier may be generated using any suitable technique. For example, a one-way hashing algorithm is applied to an item of information used by the external application to identify a target user. Examples of information used by the external application to identify a user include a social networking system identifier, an email address, a phone number, a credit card number, and a social security number. The hash identifier of the target user is generated by applying the one-way hashing algorithm to the information used by the external application to identify a user. The social networking system applies the one-way hashing algorithm to information from user profiles maintained for its users and compares the resulting hash identifier to the hash identifier of the target identifier. Hence, the hash identifiers are used to identify a user profile associated with a target user identified by the external application without revealing additional user information maintained by the social networking system to the external application.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
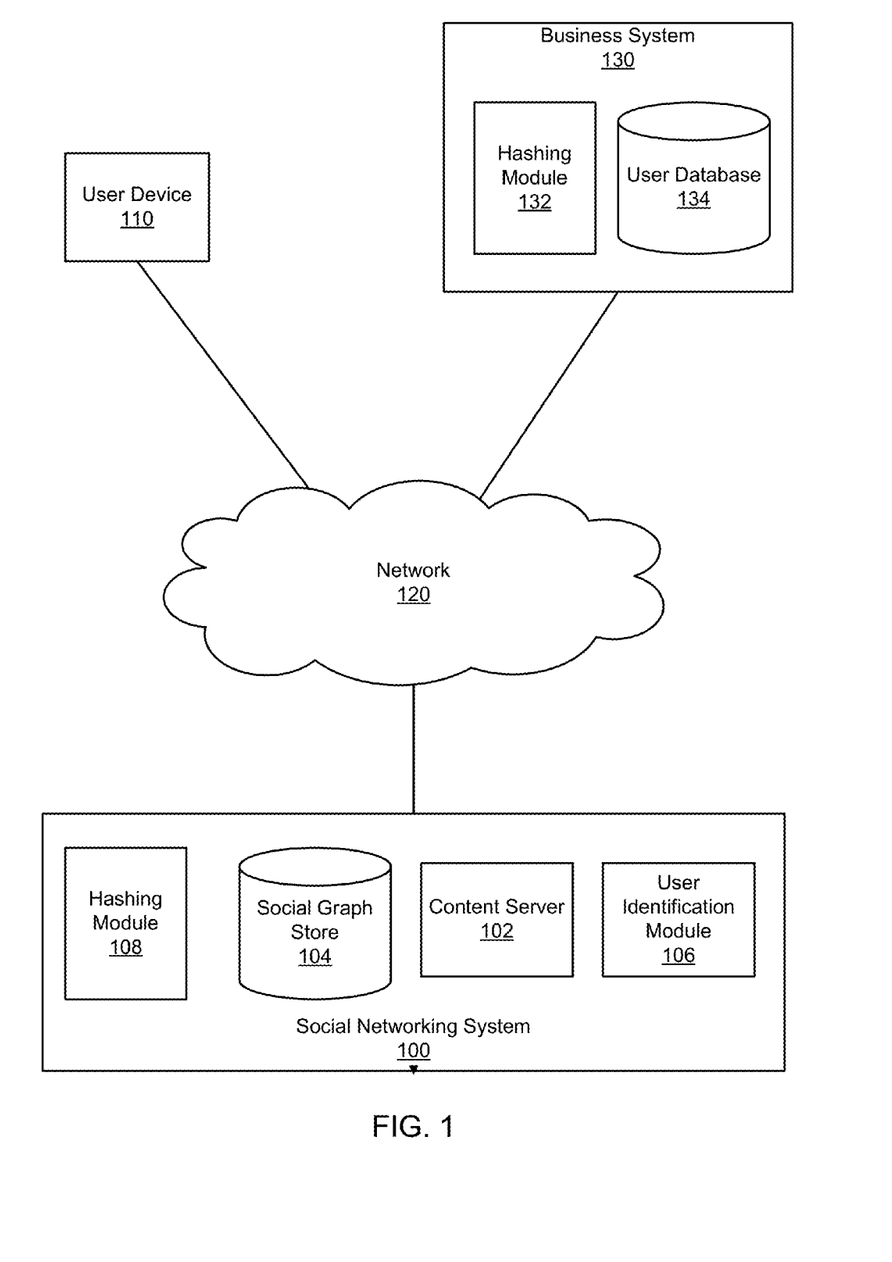
FIG. 1 is a block diagram of one embodiment of a system environment including a social networking system, according to an embodiment.

FIG. 1 is a block diagram of one embodiment of a system environment including a social networking system 100. The social networking system 100 communicates with a user device 110 and an external system 130 through a network 120. The network 120 may include wireless networks, wired networks, or a combination of network types, and provides a channel for communications between the user device 110, the external system 130, and/or the social networking system 100, which may be exchanged using any suitable communication protocol or combination of protocols.

While FIG. 1 shows a single user device 110, in practice a plurality of user devices 110 communicate with the social networking system 100 and/or with the external system 130. A user device 110 may comprises a variety of computing devices, such as a smartphone, a tablet computer, a desktop computer, a set-top box, a video game console, a television with networking capabilities, and any other suitable computing systems. The user device 110 receives social networking information from the social networking system 100 and provides the social networking information to the user of the user device 110. The user device 110 also receives user interactions from the user of the user device 110 and transmits the user interactions to the social networking system 100.

The social networking system 100 provides social networking services to a variety of users of the social networking system 100. The users of the social networking system operate user devices 110 for communicating with the social networking system. Users of the social networking system include individuals and non-individual entities. A user of the user device 110 is associated with a user profile maintained by the social networking system 100, allowing the user to form connections to other users of the social networking system 100 and to objects maintained by the social networking system. Using the user profile, the social networking system 100 selects social networking content for presentation to the user. The social networking system 100 may also use the user profile to select advertisements for presentation to the user.

Additionally, the social networking system 100 communicates messages generated by the external system 130 to users of the social networking system 100 that have a relationship or association with the external system 130. For example, the external system 130 provides an application used by social networking system users, so the social networking system 100 may receive messages from the application and communicate the messages to the users, as further described below. The application may be operated by a page owner in the social network or by any other non-user entity in order to distribute messages to one or more users of the social networking system 100 through any communications channel in the social networking system 100. As another example, the external system 130 is a retailer that may identify specific customers in a customer management system to receive a promotion or message to the social networking system 100, which identifies user profiles associated with the specified customer and uses the identified user profiles to communicate the promotion or message to the specific customers. Messages generated by the external system 130 may be personalized for delivery to specific users, so the social networking system 100 uses information from the external system 130 to identify user profiles associated with the specific users. This allows the external system 130 to transmit messages to customers in its customer management system who are also users of the social networking system 100.

To maintain user privacy while allowing message distribution, the external system 130 applies a hash function to information used by the external system 130 to identify a user. The resulting hash identifier is communicated to the social networking system 100, which applies the hash function to information in user profiles maintained by the social networking system 100. The hash identifier received from the external system 130 is compared to the hash identifiers generated from the user profile information. A user profile associated with a hash identifier matching the hash identifier received from the external system 130 is identified and used to communicate the message from the external system 130 to the user associated with the identified user profile. This allows the external system 130 to leverage the social networking system 100 to disseminate messages or content to users while allowing the social networking system 100 to prevent the external system 130 from accessing additional information about the users maintained by the social networking system 100.

The external system 130 receives interactions from users and provides content to the users. For example, the external system 130 operates an application exchanging content with users via user devices 110. As another example, the external system 130 is a retailer or content provider communicating information to its users. In one embodiment, the external system 130 maintains a user account for its users. The user account includes information used by the external system 130 to personally identify its users. A user database 134 of the external system 130 includes the information used by the external system 130 to personally identify its users. Examples of information included in the user database 134 include a social networking system identifier, a name, an email address, a phone number, a subscriber identity module (SIM) card identifier, a media access control (MAC) address, a credit card number, a social security number, or any other information suitable for identifying a user. In one embodiment, the external system 130 allows a user to access the external system 130 using account information from the social networking system 100. For example, a social networking identifier associated with a user of the social networking system 100 is used by the external system 130 to identify a user; the social networking system allows the social networking system 100 to retrieve a user profile associated with the user when received. To distribute content to users, the external system 130 communicates a request to the social networking system 100 that includes information identifying the users of the external system 130, as further described below, and the content or a link to retrieve the content.

The external system 130 also includes a hashing module 132 that applies a hash function to at least one item used by the external system 130 to personally identify users. Application of the hash function to an item personally identifying a user generates a hash identifier associated with the user. The hash identifier is communicated to the social networking system 100 in a request to communicate content, which applies the hash function to information from user profiles maintained by the social networking system 100 to generate hash identifiers. The hash identifier from the external system 130 is compared to the hash identifiers generated from the user profiles, and a user profile associated with a hash identifier matching the hash identifier from the external system 130 is identified and used to distribute content included in the request.

The hash function may be any suitable hashing method which determines a hash value for each input to the hashing module 132. The hashing method may be any transformation function that converts an item of information identifying a user into a hash identifier. The hashing method may be a lossy, deterministic, and/or one-way function, such as a checksum or an asymmetric encryption function. From the hash identifier, it may be cryptographically difficult to identify the input to the hashing method. In one embodiment, the request from the external system 130 includes a description of the hash function used and may indicate the type of user identifying information used to generate the hash identifier. For example, the request includes a hash function identifier and specifies the type of user information (e.g., e-mail address, name, credit card number, etc.) that is input to the identified hash function.

In one embodiment, the social networking system 100 includes a content server 10, a social graph store 104, a user identification module 106, and a hashing module 108. The social graph store 104 stores user profiles describing characteristics of social networking system users and other objects maintained by the social networking system 100 as well as connections between users and other objects included in the social graph store 104. Examples of objects included in the social graph store 104 include applications, events, groups, pages associated with businesses, organizations or other entities or other suitable data. An example social graph store and related information retrieval is described in U.S. Pat. No. 8,239,364, which is hereby incorporated by reference in its entirety. Content provided to users by the social networking system ("social networking content") is managed by the content server 102, which selects social networking content from data in the social graph store 104 for presentation to a user via the user device 110 based on data in the social graph store 102. For example, a user navigates to a page associated with users may navigate to pages associated with entity users who also operate external system 130. As another example, individual users may receive direct messages or other communication from the external system 130 via the social networking system 100, such as through a mailbox maintained by the social networking system 100.

The social networking system 100 also includes a user identification module 106, which identifies social networking system users corresponding to information provided by the external system 130. For example, the external system 130 provides a hashed list of customer email addresses or other information identifying users. The user identification module 106 identifies social networking system users corresponding to the hashed list based on information in the social graph store 104. In one embodiment, the user identification module 106 uses a hashing module 108 to apply a hash function to information from user profiles in the social graph store 104 and compares the results of the hash function to the hashed list from the external system 130. The hashing module 108 performs the same hash function as the hashing module 132 of the external system 130; in one embodiment, the hash function used by the external system is communicated to the social networking system 100 along with the hashed list. In this example, the hashing module 108 applies a hash function to email information of users in the social graph store 104 to generated hash identifiers for social networking system users. The user identification 106 compares the hash identifiers with the hashed list to identify social networking system users matching the hashed list.

Hence, the user identification module 106 allows the external system 130 to communicate with users via the social networking system 100 without the social networking system 100 revealing information about its users to the external system 130. If the external system 130 provides hashed user information, the social networking system 100 identifies users based on the hashed information and information stored by the social networking system 100; the social networking system 100 may then communicate information to its users matching the hashed information for the external system 130. The matching of user information stored by the social networking system 100 to the hashed information may be managed by users privacy settings over the user information. Meanwhile, user information stored by the social networking system is not provided to the external system 130, further maintaining social networking system user privacy.

The user identification module 106 matches hash identifiers generated by the external system 130 from user identifying information maintained by the external system 130 to hash identifiers generated by the user identification module 106 from information maintained by the social graph store 104. In one embodiment, the user identification module 106 may also request further information from the external system 130 or notify the external system 130 that there is no match to a hash identifier from the external system 130. In one embodiment, the user identification module 106 indicates a match for all users matching the customer information provided by the external system 130. In this embodiment, the user identification module 106 may provide a maximum number of users for the external system 130 to reach using this method. For example, if the external system 130 generates a hash identifier from user information designating a city of "New York" and a name of "John," the user identification module 106 may identify multiple users of the social networking system 100 associated with hash identifiers that match the hash identifier from the external system 130. The user identification module 106 in this case may message a limited number of the matching users or may reject the request entirely.

In one embodiment, the information provided by the external system 130 indicates whether a particular piece of information provided by the external system 130 is designated for an individual customer or whether it describes a potential group of users. For example, a external system 130 operated by a national retailer may select user information identifying users living in a particular city who are female and within a specific age range and generate a hash identifier from the selected user information. By indicating the user information specifies a group rather than an individual, the user identification module 106 allows multiple matches for the customer information.

In one embodiment, the user identification module 106 identifies a user matching hash identifiers from an external system 130 when the matching user is also connected to a social networking object associated with an entity associated with the external system 130. For example, the external system 130 may be operated by a national retailer having a page or profile stored in the social graph store 104. Certain users may be connected to the page or profile of the national retailer in the social graph 104. In this embodiment, the user identification module 106 determines whether users associated with hash identifiers generated by the user identification module that match hash identifiers provided by the external system 130 have a connection to a page or profile associated with the entity associated with the external system 130. In this embodiment, users that do not have a connection to the entity associated with the external system 130 in the social graph store 104 are not identified by the user identification module 106. Additional description of identifying social networking system users from hashed data is further described in U.S. application Ser. No. 13/306,901, filed on Nov. 29, 2011, which is incorporated herein in its entirety.

In one embodiment, the external system 130 pays a fee to the social networking system 100 for providing messages to social networking users. The fee may be based on the number of messages provided by the external system 130 or by calculating the number of users who receive a message. The fee allows the external system 130 to communicate with users of the social networking system 100 who may not have a relationship with an entity in the social networking system associated with the external system 130.

Social Graph

Figure 2:
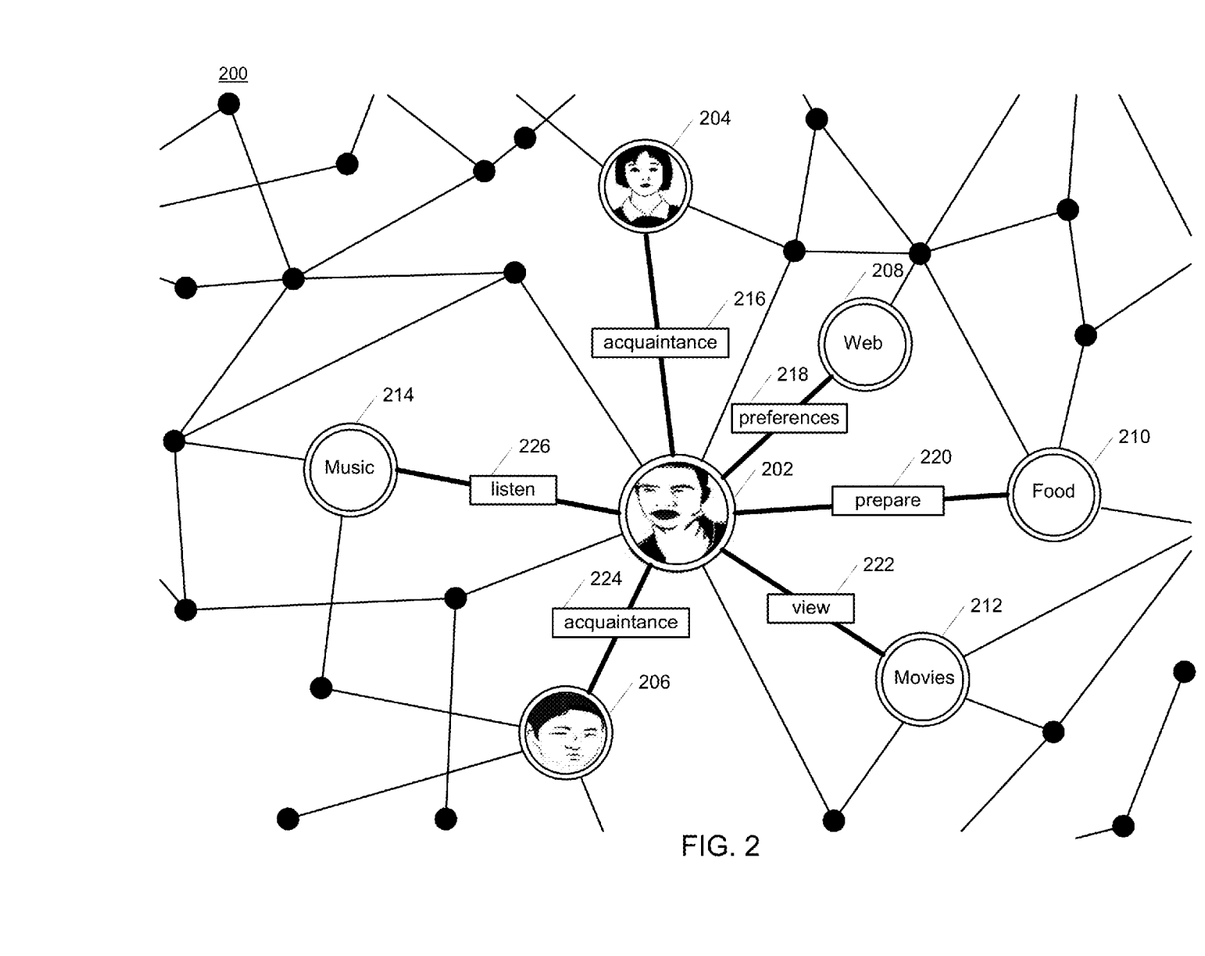
FIG. 2 is an example of a social graph maintained by a social networking system, according to an embodiment.

FIG. 2 illustrates an example social graph 200 including multiple nodes 202, 204, 206, 208, 210, 212, and 214, representing a variety of objects maintained by the social networking system that can act on and/or be acted upon by another object. In FIG. 2, the nodes 202, 204, and 206 represent user objects. The node 208 represents a page object associated with an external website, while the node 210 represents a recipe object from a cooking application. Also, the node 212 represents a video object (e.g., a movie) from a video streaming application, and the node 214 represents a song object from a music streaming application.

An edge between nodes in the social graph 200 represents a connection between the objects corresponding to the nodes, which may have a particular connection type. For example, an edge 216 between the node 202 and the node 204 has a connection type of "acquaintance" to show the relationship between the users corresponding to the node 202 and the node 204; similarly, an edge 224 between the node 202 and the node 206 also has an "acquaintance" type to show a relationship between users corresponding to the node 202 and the node 206. In another example, an edge 218 having a "preference" connection type connects the node 202 with the node 208 to illustrate that the user corresponding to the node 202 "likes" or prefers the page object corresponding to the node 208.

Connections, represented by edges, may be created from an action performed by an object on another object. For example, the user represented by the node 202 performs an action having a type of "prepare" to the recipe object corresponding to the node 210, so an edge 220 having a "prepare" connection type is created between the node 202 and the node 210. Similarly, the user represented by the node 202 performs an action of "listen" to the song associated with node 214, causing an edge 226 with a connection type of "listen" to be crated between the node 202 and the node 214. In FIG. 2, the user corresponding to the node 202 also performs a "view" action on the movie corresponding to the node 212, so an edge 222 with a "view" connection type is created between the node 202 and the node 212. Examples of other actions include listing objects in a user profile, subscribing to or joining a group or fan page, sending a message to another social networking system user, making a purchase associated with an object, commenting on a content item, or responding to an invitation to an event. Hence, the social graph 200 allows the social networking system 100 to represent objects in the social networking system 100 as well as relationships or associations between the objects.

Targeted Posts

Figure 3:
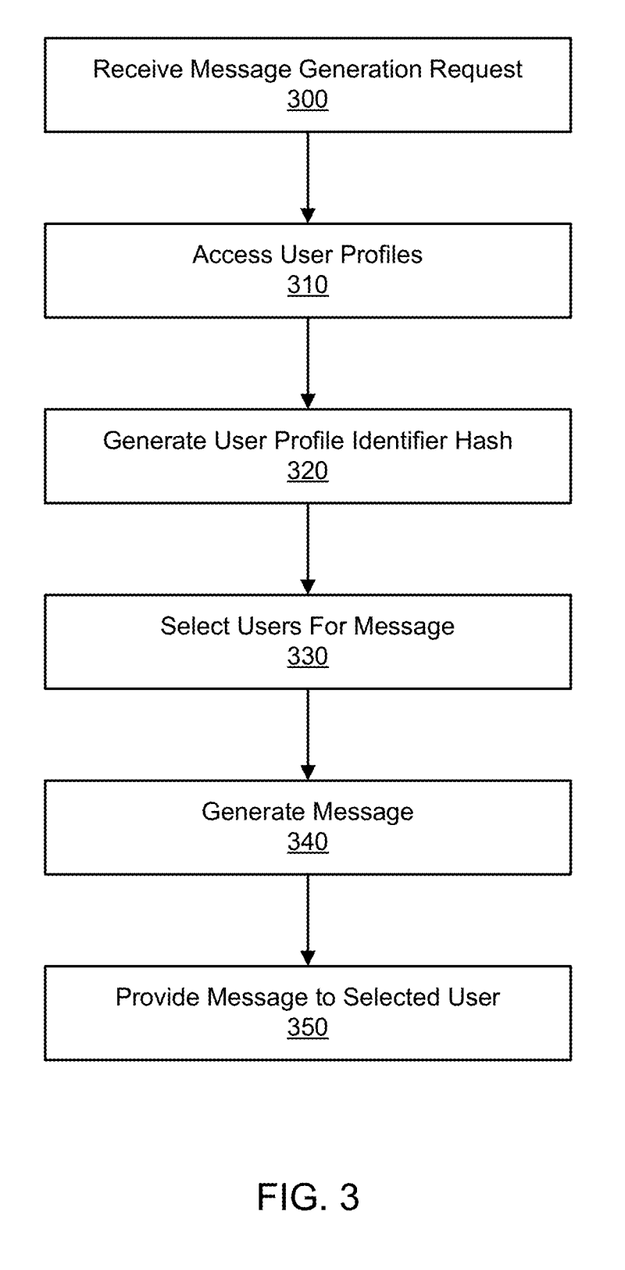
FIG. 3 is a flowchart of an example method for providing messages to users of a social networking system using information from an external business system

FIG. 3 is a flowchart of an example method for providing messages to users of a social networking system using information from an external business system. This example method is performed in one embodiment by user identification module 106. The social networking system receives 300 a request from the business system 130 to provide a message to users of the social networking system who match identifying information maintained by the business system 130. The business system 130 provides the identifying information to the social networking system 100, such as an identifier hash. The message generation request may include user identifying information associated with multiple users of the business system 130, such that each user matching user information is to be provided a message by the social networking system 100, as described above.

User profiles are accessed 310 to identify user information that may be used as identifying information for a match. The user information is used to generate 320 a user profile identifier hash that represents information in the user profile. The user profiles may be accessed 310 and a user profile identifier hash may be generated 320 prior to receiving 300 a message generation request.

Users are selected 330 to receive the message based on the hash identifier(s) received in the message generation request and the user profile identifier hashes. A message is generated 340 to provide to the selected users. The generated message may be a social networking object, such as a message object or other direct communication, a post, or an advertisement. The social networking object may be associated with the selected users in the social graph 200. As another method, the social networking object may be associated with privacy settings to allow access to the selected users. The generated message is provided 350 to the selected user(s). The generated message may be provided, for example, when the user navigates to a page on the social networking system 100 relevant to the type of message generated. For example, a generated message that is a post associated with an entity's page on the social networking system is provided when the user accesses the entity's page. To manage posts associated with the selected targeted users, the social networking system 100 may associate privacy settings with the post allowing access to the selected users. Per-post privacy settings are further described in U.S. application Ser. No. 12/485,856, filed Jul. 1, 2009, which is hereby incorporated by reference in its entirety.

Figure 4:
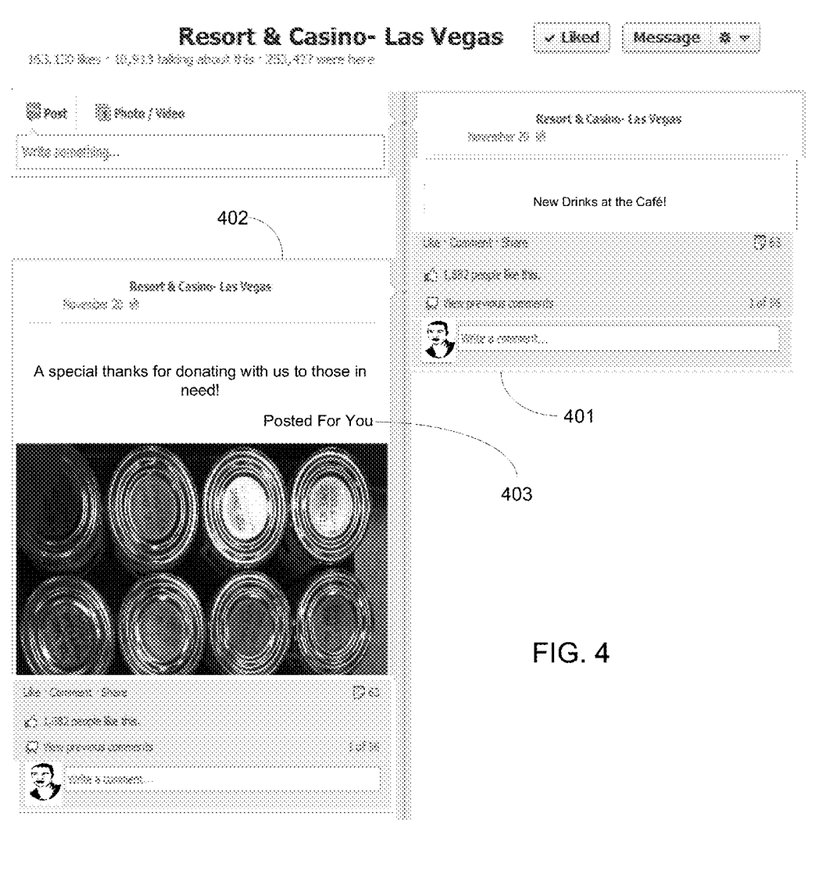
FIG. 4 illustrates an example of including user information in a post to a page associated with an external system and maintained by the social networking system.

FIG. 4 illustrates an example of including user information in a post to a page associated with an external system 130 and maintained by the social networking system 100. The posts may be tagged or include other filtering criteria for selecting recipients of the post. FIG. 4 shows an example of a user view of the entity's page. In FIG. 4, the user view 300 illustrates the view of a user to be presented with a general post 401 and a targeted post 402. The general post 401 is a post made by the entity that does not designate any particular viewers, and is shown to any user viewing the entity's page. Targeted posts 402 is directed to the viewing user accessing the page based on user information provided with the post. For example, an external system 130 generates a targeted post 402 and provides hash identifiers associated with users to be presented with the targeted post 402. In this case, the viewing user is one of the users whose hashed identifier matches the hash identifier associated with the targeted message 402. However, the user view does not show targeted posts made by the entity that do not identify the viewing user. In one embodiment, the targeted post 402 includes a targeting identifier 403. The targeting identifier 403 describes that the post is specifically intended for the viewing user. In another embodiment, the targeted post does not include such description. Hence, an external system 130 may provide targeted posts to certain viewing users via the entity's page maintained by the social networking system 100 by providing the social networking system with hash identifiers generated by the external system 130 from information identifying users maintained by the external system 130.

In one embodiment, an entity view allows the entity to view each of the targeted posts together along with the target users to be provided with the post. In one embodiment, the target users viewable by the entity are identified by user information provided by the external system 130, such as the hash identifiers generated by the external system 130.

Direct Messaging

Figure 5:
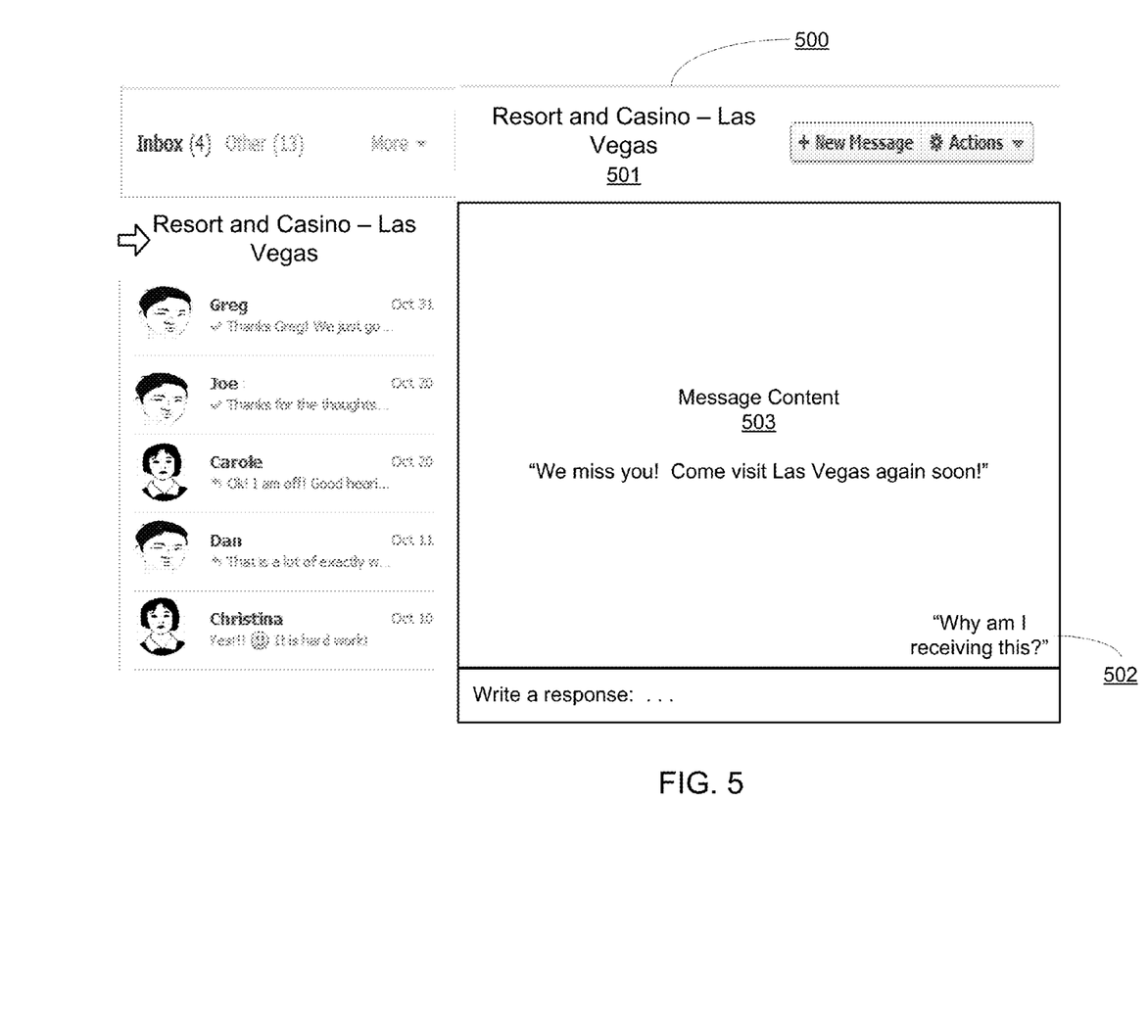
FIG. 5 is an example of a message from an external system directly communicated to a social networking system user, according to an embodiment.

FIG. 5 is an illustration of a message 500 provided to a specified user via the social networking system 100 according to one embodiment. An external system 130 may generate messages that are directly communicated to a specified user via the social networking system 100. A message 500 includes a description of the external system 501, attribution information 502, and message content 503. The external system 501 identifies the external system 130 providing the message 500 to the user. The attribution information 502 describes the nature of the personalized message to the user. For example, the attribution information 502 describes the nature of the user information provided to the social networking system 100 by the external system 130. In one embodiment, the attribution information 502 indicates to the user that the social networking system 100 has not provided user information to the external system 130. The attribution information 502 may be interactive, for example by allowing the user to hover over or click on the attribution information to receive information about the user information provided to the external system 130. The attribution information may also indicate that the user receiving the message has not been identified by user information to the external system 130. The message content 503 describes the content from the external system 130 to be presented to the user.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
  receiving, from an application external to a social networking system, a request to generate a message for delivery to one or more target users via the social network system, wherein the one or more target users are users of the application, the request including a message content for the generated message and an identifier hash for each of the one or more target users generated by the application from an item of personally identifiable information associated with a target user using a specified hash generation function, wherein the application does not send the item of personally identifiable information;
  accessing one or more user profiles maintained by the social networking system, a user profile including information about social networking system users;
  generating, an identifier hash for each of the one or more social networking system users by applying the specified hash generation function to personally identifiable information in the user profile about the social networking system user;
  for each of the received identifier hashes for the one or more target users, determining if the generated identifier hash matches the received identifier hash for the target user in the received request from the application external to the social networking system; and
  responsive to determining the match:
    generating a message, by the social networking system, to provide to one or more users of the social networking system associated with the one or more matched identifier hashes wherein the generated message includes the message content from the application external to the social networking system, and
    providing, by the social networking system, the generated message to one or more users of the social networking system associated with the one or more matched identifier hashes.

2. The method of claim 1, wherein the identifier hash for a target user is a one-way function on the item of personally identifiable information of the target user.

3. The method of claim 1, wherein the identifier hash for a target user is a cryptographic hash on the item of personally identifiable information of the target user.

4. The method of claim 1, wherein the item of personally identifiable information of the target user is selected from the group consisting of: a social networking system identifier, a name, an email address, a phone number, a subscriber identity module (SIM) card identifier, a media access control (MAC) address, a credit card number, a social security number, and any combination thereof.

5. The method of claim 1, wherein the information in the user profiles is selected from the group consisting of: a social networking system identifier, a name, an email address, a phone number, a subscriber identity module (SIM) card identifier, a media access control (MAC) address, a credit card number, a social security number, and any combination thereof.

6. The method of claim 1, wherein providing the generated message to the selected users of the social networking system associated with the selected identifier hashes for the one or more social networking system users comprises:
  transmitting the generated message directly to the one or more selected users of the social networking system associated with the selected identifier hashes for the one or more social networking system users.

7. The method of claim 1, wherein the generated message identifies the application generating the message.

8. The method of claim 1, wherein providing the generated message generated by the application to selected users of the social networking system associated with the selected identifier hashes for the one or more social networking system users comprises:
  posting the generated message to a page in the social networking system associated with the application, the generated message visible to users of the social networking system associated with the selected identifier hashes viewing the page and not visible to users of the social networking system not associated with the selected identifier hashes viewing the page.

9. The method of claim 1, wherein the generated message is a social networking object associated with one or more social networking users.

10. A method comprising:
  receiving, from a system external to a social networking system, a request to generate a message for delivery to one or more target users via the social network system, wherein the one or more target users are users of the application, the request including a message content for the generated message and an identifier hash for each of the one or more target users generated by the system external to the social networking system from an item of personally identifiable information associated with a target user using a specified hash generation function, wherein the system does not send the item of personally identifiable information;
  accessing one or more user profiles maintained by the social networking system, a user profile including information about social networking system users;
  generating an identifier hash for each of the one or more target users by applying the specified hash generation function to personally identifiable information in the user profile about the social networking system user;
  for each of the received identifier hashes for the one or more target users, determining if the generated identifier hash matches the received identifier hash for the target user in the received request from the system external to the social networking system; and
  responsive to determining the match:
    generating a message, by the social networking system, to provide to one or more users of the social networking system associated with the one or more matched identifier hashes wherein the generated message includes the message content from the application external to the social networking system, and
    providing, by the social networking system, the generated message to one or more users of the social networking system associated with the one or more matched identifier hashes.

11. The method of claim 10, wherein the identifier hash for a target user is a one-way function on the item of personally identifiable information of the target user.

12. The method of claim 10, wherein the identifier hash for a target user is a cryptographic hash on the item of personally identifiable information of the target user.

13. The method of claim 10, wherein the item of personally identifiable information of the target user is selected from the group consisting of: a social networking system identifier, a name, an email address, a phone number, a subscriber identity module (SIM) card identifier, a media access control (MAC) address, a credit card number, a social security number, and any combination thereof.

14. The method of claim 10, wherein the information in the user profiles is selected from the group consisting of: a social networking system identifier, a name, an email address, a phone number, a subscriber identity module (SIM) card identifier, a media access control (MAC) address, a credit card number, a social security number, and any combination thereof.

15. The method of claim 10, wherein providing the generated message to selected users of the social networking system associated with the selected identifier hashes for the one or more social networking system users comprises:
  transmitting the generated message directly to the selected users of the social networking system associated with the selected identifier hashes for the one or more social networking system users.

16. The method of claim 15, wherein the generated message identifies the system external to the social networking system generating the message.

17. The method of claim 10, wherein providing the generated message to selected users of the social networking system associated with the selected identifier hashes for the one or more social networking system users comprises:
  posting the generated message to a page in the social networking system associated with the system external to the social networking system, the generated message visible to users of the social networking system associated with the selected identifier hashes viewing the page and not to users of the social networking system not associated with the selected identifier hashes viewing the page.

18. The method of claim 10, wherein the request further includes a description of a hash function used to generate the identifier hash for each of the target users.

19. The method of claim 18, wherein the description of the hash function identifies a type of the item of personally identifiable information associated with the target user used to generate the identifier hash for the target user.

20. The method of claim 10, further comprising determining a fee to be paid by an operator of the system external to the social networking system, the fee determined by the number of users associated with the selected identifier hashes.

21. The method of claim 9, wherein the generated message is a post, an advertisement or other direct communication associated with one or more privacy settings.

* * * * *

UNITED STATES PATENT AND TRADEMARK OFFICE
CERTIFICATE OF CORRECTION

PATENT NO. : 9,930,078 B2  
APPLICATION NO. : 13/687397  
DATED : March 27, 2018  
INVENTOR(S) : Gokul Rajaram Page 1 of 1

It is certified that error appears in the above-identified patent and that said Letters Patent is hereby corrected as shown below:

On the Title Page

Item [57], Line 8 and 9, after "generated hash identifiers" delete "hash identifiers for social networking system users are generated".

In the Specification

Column 9, Line 66-67, after "via the social" delete "network" and insert -- networking --.

In the Claims

Column 11, Line 17, Claim 10 after "via the social" delete "network" and insert -- networking --.
Column 12, Line 36-37, Claim 17 after "viewing the page and not" insert -- visible --.

Signed and Sealed this  
Second Day of April, 2019

Andrei Iancu  
*Director of the United States Patent and Trademark Office*